(12) United States Patent
Falk et al.

(10) Patent No.: US 8,038,159 B2
(45) Date of Patent: Oct. 18, 2011

(54) CASTER LOCKING SYSTEM FOR MEDICAL TRANSPORT CART

(75) Inventors: Steven M. Falk, Baltimore, MD (US); Roopesh Edavana, Kerala (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/932,289

(22) Filed: Feb. 23, 2011

(65) Prior Publication Data

US 2011/0179625 A1    Jul. 28, 2011

Related U.S. Application Data

(62) Division of application No. 12/221,382, filed on Aug. 1, 2008, now Pat. No. 7,954,828.

(51) Int. Cl.
    *B60B 35/00*      (2006.01)

(52) U.S. Cl. .................. 280/33.994; 280/79.11; 135/67; 5/511; 5/620

(58) Field of Classification Search ............... 280/79.11, 280/47.34–35, 33.991–994, 640, 642, 647, 280/650, 651, 657–58; 135/67
See application file for complete search history.

(56) References Cited

U.S. PATENT DOCUMENTS

| | | | | |
|---|---|---|---|---|
| 3,636,586 A * | 1/1972 | Bollinger et al. | ............. | 16/35 R |
| 3,890,668 A * | 6/1975 | Stosberg et al. | ............. | 16/35 R |
| 4,037,291 A * | 7/1977 | Huempfner et al. | ........... | 16/35 R |
| 4,349,938 A * | 9/1982 | Fontana | ........................ | 16/35 R |
| 7,210,690 B2 * | 5/2007 | Tan | ............................. | 280/47.38 |
| 7,341,121 B2 * | 3/2008 | Flowers et al. | ............. | 180/6.66 |
| 7,506,890 B2 * | 3/2009 | Chen | ............................. | 280/647 |
| 7,544,742 B2 * | 6/2009 | Walsh | .......................... | 525/185 |
| 7,861,370 B2 * | 1/2011 | Chu | ............................... | 16/35 R |
| 2001/0029643 A1 * | 10/2001 | Schroeder et al. | ............ | 16/35 R |
| 2005/0151334 A1 * | 7/2005 | Flowers et al. | ............ | 280/47.11 |
| 2006/0016009 A1 * | 1/2006 | Mannix | ............................. | 5/620 |
| 2008/0012254 A1 * | 1/2008 | Giampavolo et al. | .... | 280/33.993 |

\* cited by examiner

*Primary Examiner* — J. Allen Shriver, II
*Assistant Examiner* — James Triggs
(74) *Attorney, Agent, or Firm* — Roger M. Rathbun

(57) ABSTRACT

A transport cart for attaching to a patient care apparatus having a locking system that converts the forward caster of the transport cart from an omni-directional pivotable caster to a fixed directional device by restraining its pivoting about a vertical axis. The forward caster is located at about the center of the footprint of the combined transport cart/patient care apparatus and the fixed directional movement of the forward caster provides stability in moving the combined apparatus. The locking mechanism may be internal to the caster or may have a pair of pivotable lock arms that contact the patient care apparatus as the two are brought together and the pivotable lock arms pivot to a locked position where they sandwich the caster therebetween to restrain its ability to pivot. The locking mechanism automatically or manually releases the forward caster to again freely pivot when the transport cart/patient care apparatus are separated.

7 Claims, 4 Drawing Sheets

CASTER LOCKING SYSTEM FOR MEDICAL TRANSPORT CART

REFERENCE TO RELATED PATENT APPLICATIONS

The present patent application is a divisional application of U.S. Ser. No. 12/221,382, filed Aug. 1, 2008 now U.S. Pat. No. 7,954,828 and entitled "CASTER LOCKING SYSTEM FOR MEDICAL CART" and priority to that parent application is hereby claimed.

BACKGROUND OF THE INVENTION

The present invention relates to a transport cart for transporting a patient care apparatus from one location to another within a medical facility and, more particularly, to an apparatus and system to facilitate the movement of a transport cart and the patient care apparatus when coupled together.

During the care of patients in a medical care facility, particularly infants, the infant is often maintained in a specialized environment provided within an infant care apparatus, such as an incubator or a combination incubator and warmer. An example of an infant incubator is shown and described in U.S. Pat. No. 4,936,824 of Koch et al and entitled "Infant Incubator With Air Curtain". A combination apparatus that combines the function of the infant incubator along with the function of an infant warmer is shown and described in U.S. Pat. No. 6,213,935 of Mackin et al and entitled "Infant Warming Apparatus".

In either types of the aforedescribed infant care apparatus, the infant is normally resting on a bed within the apparatus, however, there are times where the infant must be moved from one location to another within that medical care facility. While it is, of course possible to remove the infant from the particular infant care apparatus and thereafter transport the infant by means of a separate vehicle, it is more advantageous to move the infant care apparatus itself with the infant still contained therein. In such manner, the various services and treatment being provided to the infant need not be discontinued, such as monitors and the like, and also there is less disruption and consequent stress to the infant since the infant can remain in the protective environment throughout the move rather than being removed therefrom during the move and eventual return back to the protective environment of the original infant care apparatus.

Accordingly, to facilitate or carry out the move of the infant care apparatus containing the infant, there can be used a transport cart that basically docks with the infant care apparatus and both the infant care apparatus and the transport cart are coupled together and moved as a unitary apparatus. The infant care apparatus is, during the move, thereby disconnected from the normal electrical power and gases, such as oxygen and air, supplied by the medical facility and those basic needs are thereafter provided by the transport cart. The transport cart normally has batteries to supply the electrical power and gas tanks to supply the needed gases to the infant care apparatus. As such, the transport cart and the infant care apparatus are moved together without any loss of service or care to the infant.

One of the difficulties, however, with the use a docking transport cart with an infant care apparatus is that the combined transport cart and infant care apparatus becomes difficult to steer since the overall apparatus is larger then just an infant care apparatus and still must be steered by the user to negotiate the combination transport cart/infant care apparatus through the hospital corridors and through doors to reach the ultimate destination. Thus, the overall combination is rather unwieldy and is difficult to maneuver through the hospital. Since the infant care apparatus may have four caster wheels contacting the floor and the transport cart may also have three or more caster wheels and it is difficult to coordinate all of the caster wheels in moving that combination transport cart/infant care apparatus through the health care facility.

As such, the movement of a combination transport cart/infant care apparatus having conventional casters on both pieces of apparatus experience a phenomenon known as "fish tailing" which makes the movement of such apparatus very difficult and hard to control. On the other hand, if the apparatus were provided with fixed wheels, that is, the wheels rotate about a fixed axis and are capable of only unidirectional movement, the apparatus is also difficult to maneuver since the ability to turn or change direction is substantially impaired. The advantage of having a centrally located, fixed direction wheel in moving a combination transport cart/infant care apparatus is well described in U.S. Patent Application Publication 2006/0016009, published Jan. 26, 2006 and the disclosure of that Patent Application is hereby incorporated herein in its entirety by reference.

There are certain casters having a directional braking system such that the wheel is provided with a brake lever to enable the user to alter the function of the caster from omni-directional to a fixed direction movement. Such devices normally have some brake lever that must be activated by a user to change the operation of the caster or some other device operated manually by means of a cable. In any event, the change in function of the caster requires some action on the part of the user and, while feasible, the caster itself adds additional complexity and cost to the apparatus.

It would be, therefore, advantageous to have a system that allows the best of both worlds, that is, when moved individually, the transport cart and infant care apparatus have casters the enable those apparatus to be moved omni-directionally rolling on the casters, however, when the two apparatus are coupled together, one of the casters is converted to a fixed direction wheel to gain the advantage of a centrally located, one fixed direction wheel so that there is a stability to moving the transport cart/infant care apparatus.

It would be further advantageous if the conversion of a caster from omni-directional movement to a fixed direction movement could be accomplished automatically and without the deliberate intervention of a user.

SUMMARY OF THE INVENTION

The present invention relates to a transport cart for use in transporting a patient care apparatus with a medical facility. The invention is applicable to any patient care apparatus where a patient is being maintained in a medical environment, such as a patient bed for adults and the like, but is particularly suitable with, and the exemplary embodiment will be described as, an infant care apparatus where an infant is being maintained in a protective environment such as an incubator or an infant care apparatus that combines the functions of an incubator and an infant warmer.

Therefore, in accordance with the present invention, there is a transport cart supported on wheels and which is attachable to a wheeled infant care apparatus so that the transport cart can thereby move along with the infant care apparatus through such interconnection. Once affixed together the transport cart provides necessary services such as power and gas supply to the infant care apparatus.

The infant care apparatus typically is supported on casters that, as is normal, swivel or pivot about an individual vertical axis so that the infant care apparatus can readily be moved in the desired direction across the floor of the medical facility. In the usual situation, the user can push the infant care apparatus so as to relocate that apparatus to the desired location within the facility.

The transport cart also has a plurality of casters that also are rotatable so as to allow omni-directional movement and typically are casters that have rollers the contact the floor and which are, in turn, pivotable about a vertical axis in the movement of the transport cart. Other types of casters may also have omnidirectional movement, that is, the ability to allow the caster to roll in any direction, including a spherical caster that rolls about a centerpoint in any direction. As used herein, therefore, the term caster is defined to mean any caster that allows the apparatus that is being supported by the caster to roll or move in differing directions, that is, omni-directionally across a floor.

In such case, the transport cart is docked to the infant care apparatus, that is, the transport cart is wheeled up to the location of the infant care apparatus and affixed thereto by means such as latches or the like so that thereafter both the transport cart and the infant care apparatus are moved together in the joined relationship with the infant care apparatus being supplied with the utilities that are present on the transport cart.

The present invention, therefore, is a system that allows stable movement of the combination of the transport cart affixed or docked to the infant care apparatus that converts one of the casters on the transport cart from an omni-directional caster to a fixed direction device manually or during the joining of the transport cart to the infant care apparatus.

Accordingly, in accordance with the present invention, the transport cart has a rearward portion having at least two rear casters, spaced apart, and each of the casters is rotatable or pivotable about a vertical axis in the manner of a standard caster or about a point axis in the case of a spherical roller. There is also a forward portion, that is, the portion or area of the transport cart that faces and docks with the infant care apparatus when the two are affixed together and that forward portion also has a forward caster that is normally rotatable or pivotable about a vertical axis in the same manner as the rear casters.

In one exemplary embodiment, the forward caster is of a standard commercial variety where there is an internal locking mechanism that is provided on the caster that enables the user to manually convert the caster from being capable of omni-directional movement to only fixed direction movement. With such embodiment, the user can manually, such as by means of a cable or foot operated pedal, again which is commercially available, manually convert the caster from the normal caster omni-directional movement that swivels or pivots about a vertical axis, to a fixed direction device where the caster device is prevented from swiveling and can only move in a fixed direction. That conversion can be made by the user before or after the actual joining of the transport cart to the infant care apparatus. When the transport cart and infant care apparatus are later separated into individual apparatus, the user can simply disengage the locking mechanism manually and return the transport cart to its normal operation with all casters supporting the apparatus that are capable of omni-directional movement.

In another exemplary embodiment, the forward portion of the transport cart becomes located beneath the infant care apparatus and there is a locking mechanism that converts the omnidirectional forward into a fixed direction device as a consequence of the joining of the transport cart to the infant care apparatus. That locking mechanism is responsive to the contact, between the transport cart and the infant care apparatus as the two are moved into their joined position to reach a locked position by means of a pair of pivotable lock arms having distal ends that contact the frame of the infant care apparatus. That contact causes the pivotable lock arms to pivot to a position where they are in close proximity and oppositely disposed with respect to the forward caster, thereby sandwiching the forward caster therebetween and restraining the forward caster from its normal pivoting action about a vertical axis. In such manner, the forward caster becomes a fixed direction device auomatically.

Once the patient cart and infant care apparatus are again disengaged, the same locking mechanism returns to an unlocked position where the pivotable lock arms are displaced away from the forward caster to allow the forward caster to again pivot freely about is vertical axis.

Accordingly, the locking mechanism of this embodiment achieves the best of both worlds without the need for the user to manually activate some locking device on the forward caster as with the prior embodiment. Separately, both the transport cart and the infant care apparatus are freely movable resting on casters that are omni-directionally movable. When joined together, however, the forward caster is restrained from pivoting movement and is converted to a fixed directional device that is most advantageous for moving the combination transport cart/infant care apparatus along the floor of the health care facility.

These and other features and advantages of the present invention will become more readily apparent during the following detailed description taken in conjunction with the drawings herein.

DETAILED DESCRIPTION OF THE INVENTION

Figure 1:
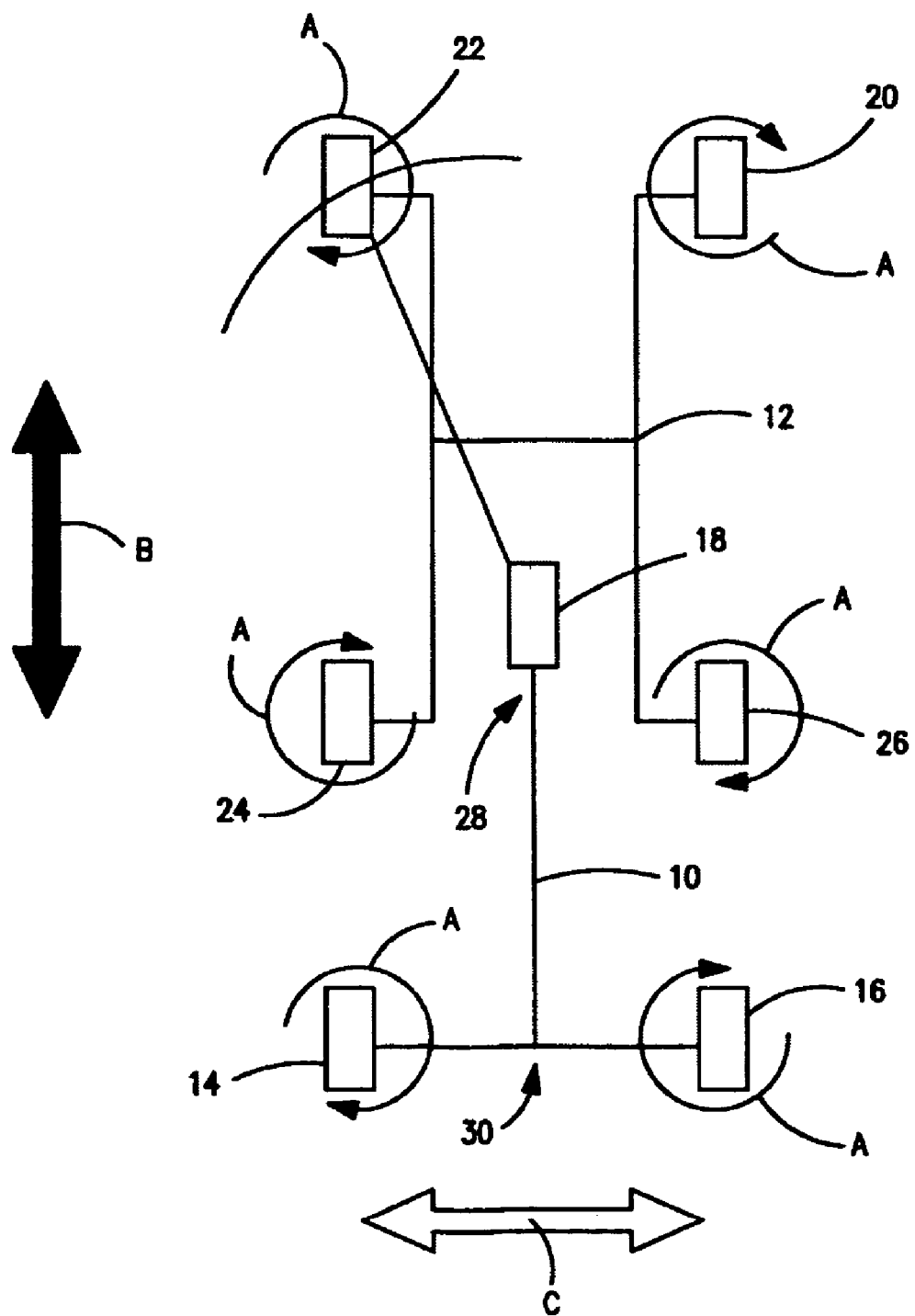
FIG. 1 is a schematic view of a transport cart in position joined to an infant care apparatus.

Referring now to FIG. 1, there is shown a schematic view of a transport cart 10 that is joined to an infant care apparatus 12 such that the combined transport cart/infant care apparatus can be transported about a medical facility by, for example, pushing on the transport cart 10. It should again be noted that the present invention is applicable to a patient care apparatus that supports a patient while that patient is undergoing treatment and where a source of electrical power is required to power various devices that provide care and/or monitor the status of the patient, including adult and infant beds or other such apparatus. Those devices requiring electrical power may be incorporated into the patient care apparatus or may be simply mounted to the patient care apparatus and therefore move with the patient care apparatus when the patient care apparatus is moved from one location to another location carrying the patient.

As can be seen, the transport cart 10 has casters 14, 16 that roll along the floor of the health care facility and which pivot about a vertical axis. The patient cart 10 also has a forward fixed wheel 18 that will be later explained. The patient care apparatus 12 has casters 20, 22, 24 and 26 that are also used in moving the infant care apparatus 12 along the floor.

The casters can be of a conventional type where the casters comprise small rollers that rotate about a horizontal axis but that horizontal axis is free to swivel or rotate about a vertical axis. The small roller is offset with respect to the vertical axis to allow the small roller to both swivel and rotate to allow the infant care apparatus 10, or the transport cart 12, when separate, to be moved omni-directionally within the health care facility. Other types of casters can, of course be used such as a spherical roller that contacts the floor and which is free to rotate omni-directionally about its centerpoint axis, it only being of importance that the caster allow the infant care apparatus to be rolled along the floor in differing directions.

In the schematic view of FIG. 1, it can be seen that the forward fixed wheel 18 enters into and is located within the footprint of the infant care apparatus 12 and is forward with respect to the casters 14 and 16 that are located at the rear of the transport cart 10. As used herein, the portion of the transport cart 10 that faces, and thus enters underneath the infant care apparatus 12 as the transport cart 10 is docked to the infant care apparatus 12 will be referred to as the forward portion 28 and the portion of the transport cart 10 that faces away from the infant care apparatus 12, when docked thereto, will be referred to as the rearward portion 30.

As previously explained, if all of the floor contacting devices of the transport cart 10 and the infant care apparatus 12 were fully pivotable casters, there would be an inherent instability in the moving of the combined transport cart/infant care apparatus across the floor of the health care facility.

As such, stability is provided by designing the forward fixed wheel 18 to not pivot about a vertical axis but, to the contrary, the forward fixed wheel 18, located at about the center of the footprint of the transport cart/infant care apparatus, moves in a unidirectional or fixed direction path and not omni-directionally as with a normal caster. It is, therefore, sufficient to say that the arrangement as illustrated in FIG. 1 is advantageous in having the centrally located, forward fixed wheel 18 capable of only a fixed directional movement to facilitate the movement of the combined transport cart/infant care apparatus.

Accordingly, as seen in FIG. 1, the casters are all capable of pivoting fully about their vertical axis as illustrate by the arrows A while the forward, fixed wheel 18 is not pivotable. The direction of motion of the combined transport cart/infant care apparatus is therefore readily movable in the double arrow B and is restricted from side to side motion shown by the double arrow C.

Figure 2:
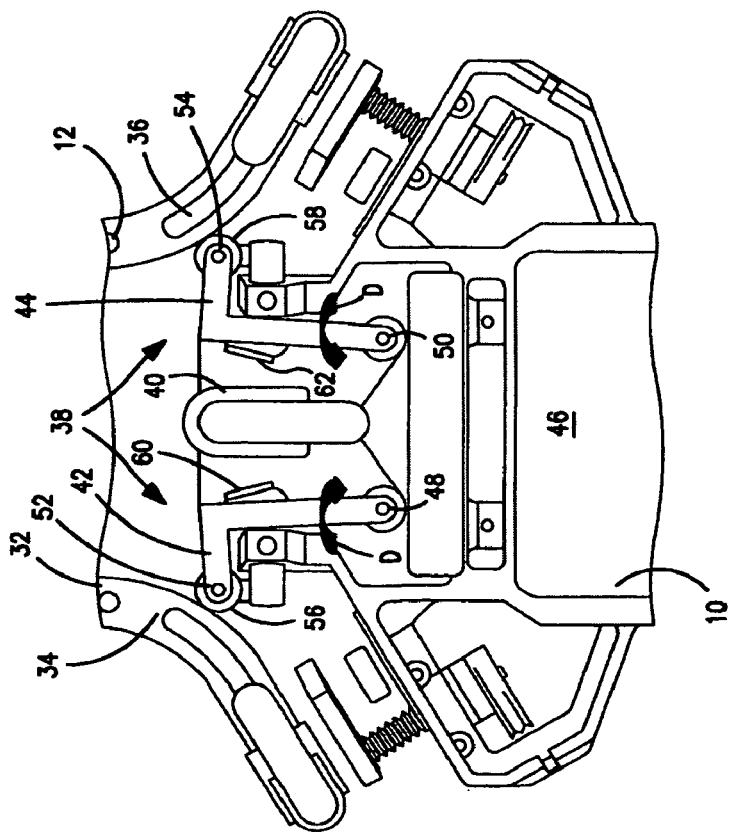
FIG. 2 is a schematic view of a transport cart being moved into position to be joined to an infant care apparatus illustrating the locking mechanism of the present invention in the unlocked position.

Turning now to FIG. 2, there is shown a bottom schematic view of a transport cart 10 being joined to an infant care apparatus 12 by means of the embodiment that automatically converts an omni-directional caster to a fixed directional device. Accordingly, it can be seen that the infant care apparatus 12 has a base 32 comprising two structural members 34, 36 that extend outwardly and form a generally curved V-shaped configuration.

There is a locking mechanism on the transport cart 10, shown generally at 38, that basically converts the fully pivotable forward caster 40 into a fixed directional device. That locking mechanism 38 is comprised of two pivotable lock arms 42, 44 that are pivotally mounted to the frame 46 of the transport cart 10 about fixed pivot points 48, 50. The pivotable lock arms 42, 44 are illustrated to be L-shaped having distal ends 52, 54 that extend outwardly from the frame 46 of the transport cart 10 and pivot in the directions of the arrows D. There are rollers 56, 58 located at the distal ends 52, 54 and the purpose of the rollers 56, 58 will later become clear.

There are also pads 60, 62 mounted onto or incorporated as a part of the pivotable lock arms 42, 44 and which move toward and away from the forward caster 40 as the pivotable lock arms 42, 44 pivot about pivot points 48, 50. As seen in FIG. 2, the pads 60, 62 as well as the pivotable lock arms 42, 44 are displaced away from the caster 40 such that the caster 40 is relatively free to pivot about its vertical axis. Thus, in FIG. 2, the locking mechanism 38 is in its unlocked position.

Figure 3:
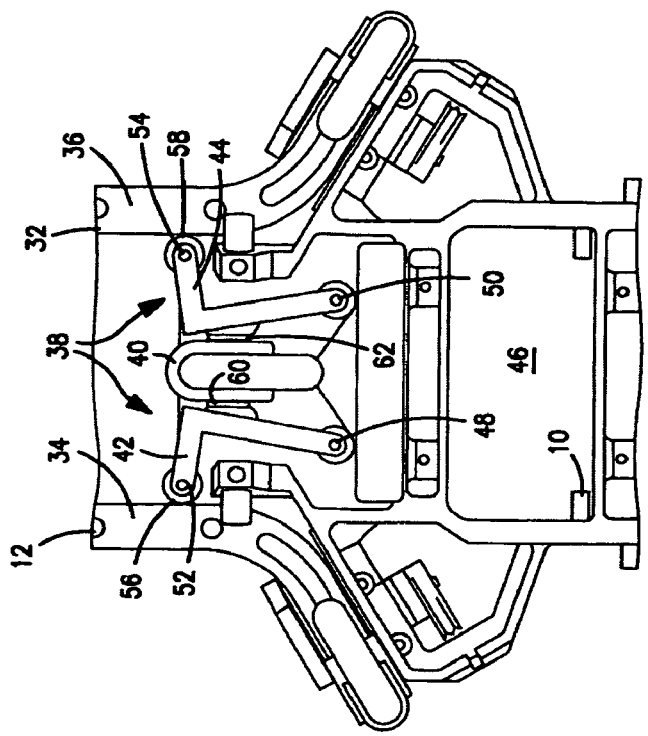
FIG. 3 is a schematic view of a transport cart joined to an infant care apparatus illustrating the locking mechanism of the present invention in the unlocked position.

Turning next to FIG. 3, taken along with FIG. 2, there is shown a schematic view of the transport cart 10 fully inserted into its joined position with respect to the infant care apparatus 12 such that the two pieces of apparatus are movable together.

As such, in the schematic of FIG. 3, it can be seen that the movement of the transport cart 10 in the forward direction, that is, toward the infant care apparatus 12, has caused the rollers 56, 58 to contact and follow the structural members 34, 36 and move inwardly as the transport cart 10 has moved into its joined position of FIG. 3. By that forward movement of the transport cart 10, the narrowing base 32 of the infant care apparatus 12 causes the pivotable lock arms 42, 44 to revolve about pivot points 48, 50, thereby pivoting the pivotable lock arms 42, 44 to the position shown in FIG. 3 where the pads 60, 62 are located proximate to or adjacent and oppositely disposed with respect to the forward caster 40, thereby sandwiching the forward caster 40 between the two pads 60, 62.

The position of the locking mechanism 38 is then in its locked position such that the pads 60, 62 prevent the pivoting of the forward caster 40 about its vertical axis and essentially convert the normal omni-directional forward caster 40 into a fixed direction device, that, as explained, is desired for the moving of the combined transport cart/infant care apparatus though the health care facility.

While the foregoing explanation has explained the joining of the transport cart 10 to the infant care apparatus 12, it can be seen that the removal of the transport cart 10 has the effect of moving the locking mechanism from the locked position of FIG. 3 to the unlocked position of FIG. 2 since the locking mechanism 38 is biased towards its unlocked position as will later be explained. Thus, as the transport cart 10 is moved away from its joined position to the infant care apparatus 12, the pivotable lock arms 42, 44 will pivot outwardly and move the pads 60, 62 away from their position constraining the pivoting of the forward caster 40. Thus, the forward caster 40 is again allowed to freely pivot when the transport cart 10 has been removed from its joined position with the infant care apparatus 10 and the infant care apparatus 12 and the transport cart 10 are again freely movable as supported on all casters.

Figure 4:
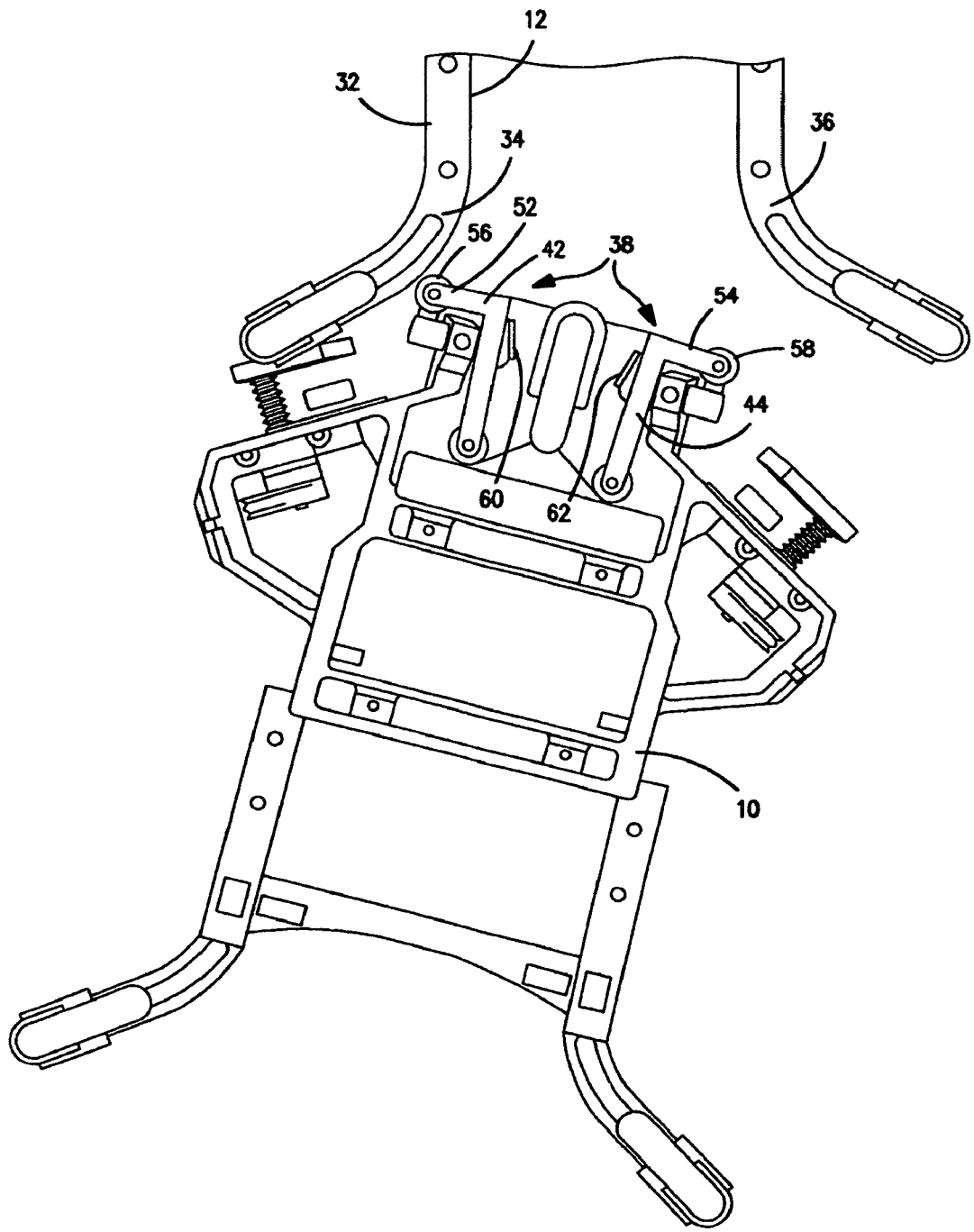
FIG. 4 is a schematic view of a transport cart making initial contact with an infant care apparatus in the process of joining the transport cart to the infant care apparatus.

Turning next to FIG. 4, there is shown a schematic view of the transport cart 10 being moved to its joined position with the infant care apparatus 12 such that it is shown in a misaligned orientation. By use of the pivotable lock arms 42, 44 and the rollers 60, 62 at the distal ends 52, 54, however, the roller 60 is shown contacting the structural member 34 such that the continued movement of the transport cart 10 toward the infant care apparatus 12 allows the roller 60 to guide the transport cart 12 into the desired joined position with the infant care apparatus 12. As such the pivotable lock arms 42, 44 not only function as components of the locking mechanism 38 but also serve to guide the transport cart 10 into its position where it can be readily joined to the infant care apparatus 12.

Figure 5:
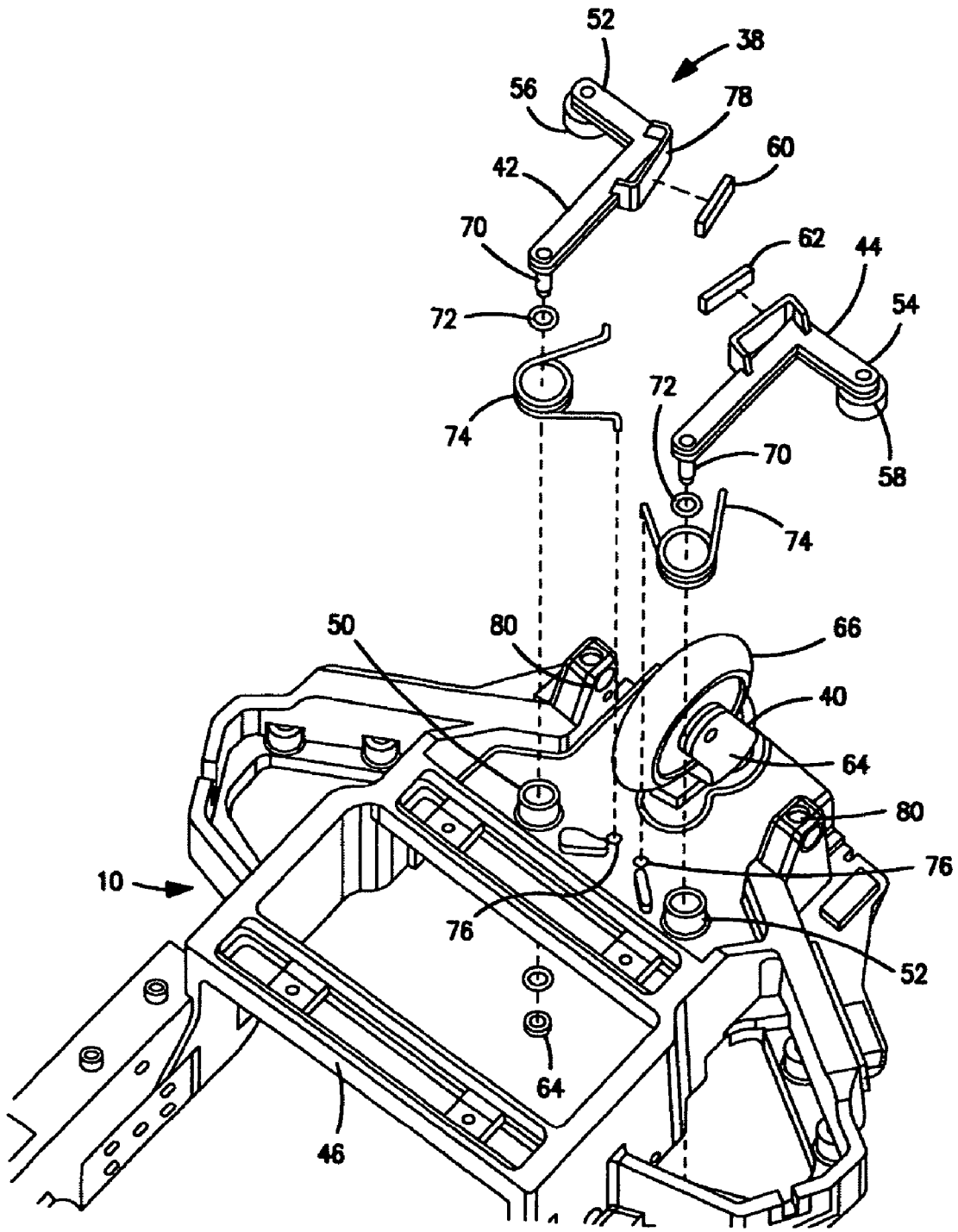
FIG. 5 is an exploded view of the underside of the transport cart and illustrating the locking mechanism of the present invention.

Turning finally to FIG. 5, taken along with FIGS. 2-4, there is shown an exploded view of the underside of the transport cart 10 in order to illustrate the components of the locking mechanism 38. As can be seen in FIG. 5, the underside of the frame 46 of transport cart 10 is shown with the forward caster 40 pivotally affixed thereto. The caster 40 comprises a caster mounting frame 64 supporting the caster roller 66 that freely rolls about a horizontal axis provided in the caster mounting frame 64. As is conventional, the caster roller is offset such that it pivots about its vertical axis as the transport cart 10 is moved across a floor in order to change direction. As has been explained, one of the advantages of the present invention is that the forward caster 40 can be a conventional caster and not require custom modifications or special added features to be used with the present invention.

As also can be seen, the pivotable lock arms 42, 44 are mounted to pivot points 50, 50 formed in the frame 46 and can be affixed in position by nuts 68 screwed onto threaded shafts 70 for each of the pivotable lock arms 42, 44. Nylon washers 72 can be provided so as to facilitate the pivoting of the pivotable lock arms 42, 44.

As noted, the pivotable lock arms 42, 44 are spring biased toward the unlocked position of the locking mechanism 38, that is, where the pivotable lock arms 42, 44 are in their location displaced away from the forward caster 40. That spring bias can be provided by springs 74 that are torsional springs having one end fixed to the frame 46 by insertion into openings 76 and the other ends affixed to the pivotable lock arms 42, 44.

The pads 60, 62 are also shown in FIG. 5 and can be affixed to the pivotable lock arms 42, 44 by means of spring clips 78. The rollers 56, 58 can also be seen as rotatably affixed to the distal ends 52, 54 of the pivotable lock arms 42, 44.

As such, when the pivotable arms 42, 44 are in the locked position of the locking mechanism 58, they are positioned in close proximity to both sides and thereby sandwich the forward caster 40 therebetween to restrain the pivoting of that forward caster 40 and convert the forward caster 40 from an omni-directional caster into a fixed directional device. When the locking mechanism 58 is in the unlocked position, the pivotable lock arms 42, 44 abut against stoppers 80 that serve to hold the pivotable stop arms 42, 44 in their outermost positions. The stoppers can be an integral part of the frame 46 with bumpers provided in the frame 46 to cushion the impact of the lock arms 42, 44 as they move outwardly.

As noted, however, there is an alternate exemplary embodiment where the forward caster 40 is a commercially available caster where there is an internal locking mechanism on the caster itself that can be manually operated by a user to convert the forward caster 40 between a locked position wherein the caster is constrained to move uni-directionally, that is, along a fixed direction and a unlocked position wherein the caster acts as a normal caster and is pivotable about a vertical axis so as to be capable of omni-directional movement.

The conversion is controlled by the user, such as through a lever or a cable operated mechanism that is operated by the user to carry out that conversion and, therefore, the forward caster 40 can be converted to a fixed direction device at the time the transport cart 10 is joined to the infant care apparatus 12. After the transport cart 10 and the infant care apparatus 12 are again separated, the user simply manually operates the internal locking mechanism to return the forward caster 40 to its normal omni-directional condition.

Those skilled in the art will readily recognize numerous adaptations and modifications which can be made to the caster locking system for a medical transport cart which will result in an improved system and method yet all of which will fall within the scope and spirit of the present invention as defined in the following claims. Accordingly, the invention is to be limited only by the following claims and their equivalents.

What is claimed is:

1. A method of joining a medical transport cart to a patient care apparatus,
   providing a transport cart having a rearward portion having at least two rear casters and a forward portion having a forward caster affixed to the transport cart proximate to the forward portion and being pivotable about a vertical axis, the transport cart having a locking mechanism movable between an unlocked position displaced away from the forward caster and a locked position where the locking mechanism restrains the pivotal movement of the forward caster about the vertical axis,
   providing a patient care apparatus having a plurality of casters supporting the infant care apparatus,
   joining the transport cart to the patient care apparatus by progressively moving the transport cart toward and into contact with the patient care apparatus,
   moving the locking mechanism from the unlocked position to the locked position by the contact and progressive movement of the transport cart toward the patient care apparatus wherein the locking mechanism restrains the pivoting of the forward caster when the transport cart is joined to the patient care apparatus.

2. The method of claim 1 wherein the method further includes the step of returning the locking mechanism to the unlocked position by moving the transport cart away from contact with the patient care apparatus.

3. The method of claim 1 wherein the locking mechanism returns to the unlocked position by means of a spring bias.

4. The method of claim 1 wherein the step of providing a patient care apparatus comprises providing an infant care apparatus and the step of attaching the transport cart to the infant care apparatus forms a combination of transport cart/infant care apparatus.

5. The method of claim 1 wherein the step of providing a patient care apparatus comprises providing a patient care apparatus having a V-shaped frame and wherein the step of providing a locking mechanism comprises providing a locking mechanism having lock arms with distal ends extending outwardly from the transport cart, and the step of moving the locking mechanism from the unlocked position to the locked position by the contact and progressive movement of the transport cart toward the patient care apparatus comprises contacting the distal ends of the lock arm with the patient care apparatus.

6. The method as defined in claim 5 wherein the step of providing a locking mechanism having lock arms with distal ends extending outwardly from the transport cart comprises providing lock arms with distal ends comprising rollers and wherein the step of moving the locking mechanism from the unlocked position to the locked position by the contact and progressive movement of the transport cart toward the patient care apparatus comprises contacting the rollers with the patient care apparatus.

7. The method as defined in claim 6 wherein the step of providing a providing a patient care apparatus comprise providing a patient care apparatus having a V-shaped frame, and the step of moving the locking mechanism from the unlocked position to the locked position by the contact and progressive movement of the transport cart toward the patient care apparatus comprises contacting the rollers with the V-shaped frame of the patient care apparatus.

* * * * *